(12) United States Patent
Blankenship et al.

(10) Patent No.: US 6,995,337 B2
(45) Date of Patent: Feb. 7, 2006

(54) POWER SOURCE WITH SATURABLE REACTOR

(75) Inventors: George G. Blankenship, Chardon, OH (US); Robert L. Dodge, Mentor, OH (US); Lifeng Luo, Solon, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 173 days.

(21) Appl. No.: 10/617,120

(22) Filed: Jul. 11, 2003

(65) Prior Publication Data

US 2005/0006364 A1    Jan. 13, 2005

(51) Int. Cl.
  *B23K 9/10*    (2006.01)
(52) U.S. Cl. ................................. 219/130.1
(58) Field of Classification Search ............. 219/130.1, 219/130.31, 130.32, 130.33, 130.5, 130.51
  See application file for complete search history.

(56) References Cited

U.S. PATENT DOCUMENTS

| 2,594,890 | A | * | 4/1952 | Ellwood ...................... 361/11 |
| 3,300,682 | A | * | 1/1967 | Frungel et al. ............. 315/171 |
| 3,678,341 | A | * | 7/1972 | Constable ................... 361/118 |
| 3,999,034 | A |   | 12/1976 | Barhorst |
| 4,418,265 | A | * | 11/1983 | Tabata et al. ............ 219/130.4 |
| 4,694,387 | A | * | 9/1987 | Walker ........................ 361/11 |
| 4,970,464 | A |   | 11/1990 | Williams |
| 5,349,157 | A | * | 9/1994 | Blankenship .......... 219/130.32 |
| 5,351,175 | A |   | 9/1994 | Blankenship |
| 6,489,592 | B2 |  | 12/2002 | Stava |
| 6,578,253 | B1 |  | 6/2003 | Herbert |
| 6,700,357 | B2 | * | 3/2004 | Taniguchi .................... 322/99 |

FOREIGN PATENT DOCUMENTS

| EP | 0 605 879 A | 7/1994 |
| FR | 2 592 749 | 7/1987 |
| GB | 1 310 361 | 3/1973 |
| JP | 04 165610 | 6/1992 |

* cited by examiner

*Primary Examiner*—Clifford C. Shaw
(74) *Attorney, Agent, or Firm*—Fay, Sharpe, Fagan, Minnich & McKee, LLP (57) ABSTRACT

In a power source for an electric arc welder including an inverter having two primary circuits connected in a series circuit across the DC bus of an input rectifier where each primary circuit comprises a capacitor parallel with a primary winding section and a switch to apply the voltage of the capacitor across the primary winding section, so that the primary circuits alternately create a voltage pulse in the primary winding sections to induce voltage pulses in a secondary circuit having a secondary winding coupled to said primary windings and connected by an output circuit to an output welding circuit. There is provided one improvement. The improvement is a soft ferrite saturable reactor in at least one of the series circuit or the output circuit to delay the voltage pulse in the primary winding sections.

35 Claims, 6 Drawing Sheets

POWER SOURCE WITH SATURABLE REACTOR

The present invention relates to a power source of the type used for electric arc welding and more particularly to a power source utilizing a novel saturable reactor for enhancing the operation of the power source.

INCORPORATION BY REFERENCE

The present invention is directed toward a power source of the type including two switching circuits in series across separate capacitors so that the two primary switching circuits alternately create pulses in the secondary network of a transformer. A power source generally similar of the type to which the present invention is directed is shown in Blankenship U.S. Pat. No. 5,351,175. The environment to which the present invention is used also includes an output circuit between the secondary networks and a welding installation wherein spaced, parallel switches can be used to operate the electric arc welder in either AC, positive DC or negative DC modes. Such an output switching network is shown in Stava U.S. Pat. No. 6,489,592. These two patents are incorporated by reference as general information regarding the power supply to which the present invention is particularly directed. They do not show the invention, but are merely background so the details of the operation of the power source need not be repeated.

BACKGROUND OF INVENTION

Electric arc welders using inverter power supplies using high voltage power main often employ two primary switching circuits connected in series to accommodate the high voltage. This general concept is shown in Blankenship U.S. Pat. No. 5,351,175. These two series connected switching circuits are then coupled by a transformer to the output welding circuit of the welder. A system must be included in the power source to balance the series connected primary circuits to avoid voltage imbalance that can damage the electrical components of the two circuits. This balancing of the series primary circuit is normally achieved by diode clamping network that pumps charge back to the capacitors of the series connected primary circuits to maintain equal voltage on the two series connected capacitors during the switching operation. Each series circuit normally includes two power switches connected in series that are rendered conductive to energize one of the primaries of the input primary network with the voltage across one of the series connected capacitors. When the first set of switches are conductive, the second pair of switches in the other primary circuit are not conductive. However, the voltage across the first primary circuit is inductively coupled through the transformer core to the primary winding of the second primary circuit. If the voltage across the second capacitor is less than the voltage across the first capacitor, current flows through the clamping diodes of the second circuit to equalize the voltage across the two series connected input capacitor of the primary circuits. During subsequent switching cycles, the first pair of switches is turned off and the second pair of switches is turned on to energize the primary winding of the second series circuit using the voltage across the second input capacitor. This voltage is likewise inductively coupled through the transformer core to the primary winding of the first primary circuit. Again, if the voltage across the first capacitor is less than the voltage across the second capacitor, a current flows through the diodes of the first primary circuit. Utilizing this method, the two capacitors are balanced during the high speed switching operation. However, this common method fails when the conduction time of the switches is too low to allow adequate time for the clamping circuits in the two series primary circuits to turn on properly. This condition occurs when the transformer is regulating current into a low voltage or short circuit load. In this situation, the capacitors become unbalanced. This condition can damage the electrical components; therefore, expensive software programs are often used to sense the voltage across the input capacitors and deactivate one of the primary winding circuits awaiting balance of the two capacitors. This is expensive and requires an active control arrangement for the output. The skip firing of one set of switches has been used for power supplies; however, this arrangement presents a real problem when regulating low current for welding processes, such as TIG or pulse MIG welding. It is also a problem when regulating low voltages for processes such as Reduced Voltage Starting of a welding circuit. Such active, software correction of the power source transformer used in electric arc welding is expensive and not satisfactory for welding.

THE PRESENT INVENTION

In accordance with the present invention, a saturable reactor is connected in series with the transformer of the power source, as explained above. The saturable reactors or saturable reactor inhibits voltage during the time immediately after one of the switch pairs is rendered conductive. This delayed action thereby prevents power from being coupled to the secondary network of the transformer at the output of the inverter power source. Thus, the switch pairs are rendered conductive for a greater time allowing the diode clamping network of the two primary circuits time to balance the charge on the capacitors so the capacitors remain in balance during the high speed switching operation. The setting of the time delay for the saturable reactors is about 1.0 ms. This allows adequate time for the clamping networks of the two switching circuits to operate properly and balance the voltages on the input capacitors of the two series connected primary circuits.

The switching characteristics of the saturable reactor is softer than an electronic switch such as an IGBT. When switching is initiated, the saturable reactor blocks the voltage applied until the reactor saturates. Consequently, current does not flow until saturation occurs. The current rises as the magnetic core is saturated and this turn-on characteristic occurs slowly and softly compared to the fast switching of an electronic switch. Thus, there is a benefit in less parasitic ringing in the electrical signal. Since the saturable reactor provides a delay in the switching cycle, there is no power being transferred from the primary circuit to the secondary circuit until the saturable reactor is saturated. Consequently, the pulse width of the control circuit can be reduced below the delay time of the saturable reactor so that there is a zero output power even though there is a switching operation. A short pulse with a time less than the delay of the saturable reactor allows switching without output power. This provides an arrangement using the novel saturable reactor to accomplish smooth regulation from a zero power output to a full power output without using a skip firing control circuit of the prior art. At low power or no power operation, the two series capacitors remain in balance using the normal clamping network of each primary circuit. Utilizing the skip firing technique based upon software, the capacitors can be balanced but this arrangement for balancing the capacitors is not generally acceptable for TIG or pulse MIG welding.

In accordance with the present invention there is provided an improvement in a power source for an electric arc welder including an inverter having two primary circuits connected in a series circuit across the DC bus of an input rectifier. Each of the primary circuits in the series circuit comprises a capacitor in parallel with a primary winding section and a switch or switches to apply the voltage of the capacitor across the primary winding section. In this manner, the primary circuits alternately create a voltage pulse in the primary winding section to induce voltage pulses in a secondary circuit having a secondary winding transformer coupled to the primary windings and connected by an output circuit to an output welding circuit. The improvement in this type of two stage primary power sources is the use of soft ferrite saturable reactor in at least one of the series circuits or output circuits to delay the voltage pulse in the primary winding section. The saturable reactor has the normal ring shape and is mounted around the wires constituting either the series circuit of the primary circuits or the output circuit. In accordance with the invention, the soft ferrite used for the saturable reactor has a saturation flux density less than about 0.40 tesla. This is dimensioned to produce a delay in the primary windings of at least 0.5 microsecond. The saturable reactor is a ring having a ratio of surface area to volume greater than 3.5 $cm^2/cm^3$ to optimize operation and surface cooling. The output circuit is normally a rectifier with two input leads wherein the saturable reactor is a ring surrounding both of these leads extending from the secondary circuit of the invention.

In accordance with another aspect of the present invention there is provided a saturable reactor ring for delaying the voltage of a primary winding circuit of a transformer having a secondary winding circuit, wherein a saturable reactor has a saturation flux of less than 0.40 Tesla. This saturable reactor has a length greater than the outside diameter in one embodiment. In another embodiment, the cross-section of the ring is a rectangle having a width greater than its height. Furthermore, a heat sink tube is positioned around the saturable reactor ring, in accordance with a further feature of the invention.

The primary object of the present invention is the provision of a saturable reactor in series with the transformer of an inverter type power source used in electric arc welding to provide a slight delay in the primary voltage pulse to balance the voltage of the series connected input capacitor.

Yet another object of the present invention is the provision of a saturable reactor as defined above, which saturable reactor has a soft ferrite with a saturation flux of less than 0.40 tesla and a high ratio of surface area to volume. In practice, this ratio exceeds 3.5.

Yet another object of the present invention is the provision of an improved power source for electric arc welder utilizing the saturable reactor defined above.

Yet a further object of the present invention is the provision of an improved pulses transformer of an inverter driven welder which pulse transformer employs a saturable reactor to delay the primary pulses for the purposes of stabilizing the input circuit of the transformer.

These and other objects and advantages will become apparent from the following description taken together with the accompanying drawings.

PREFERRED EMBODIMENT

Figure 1:
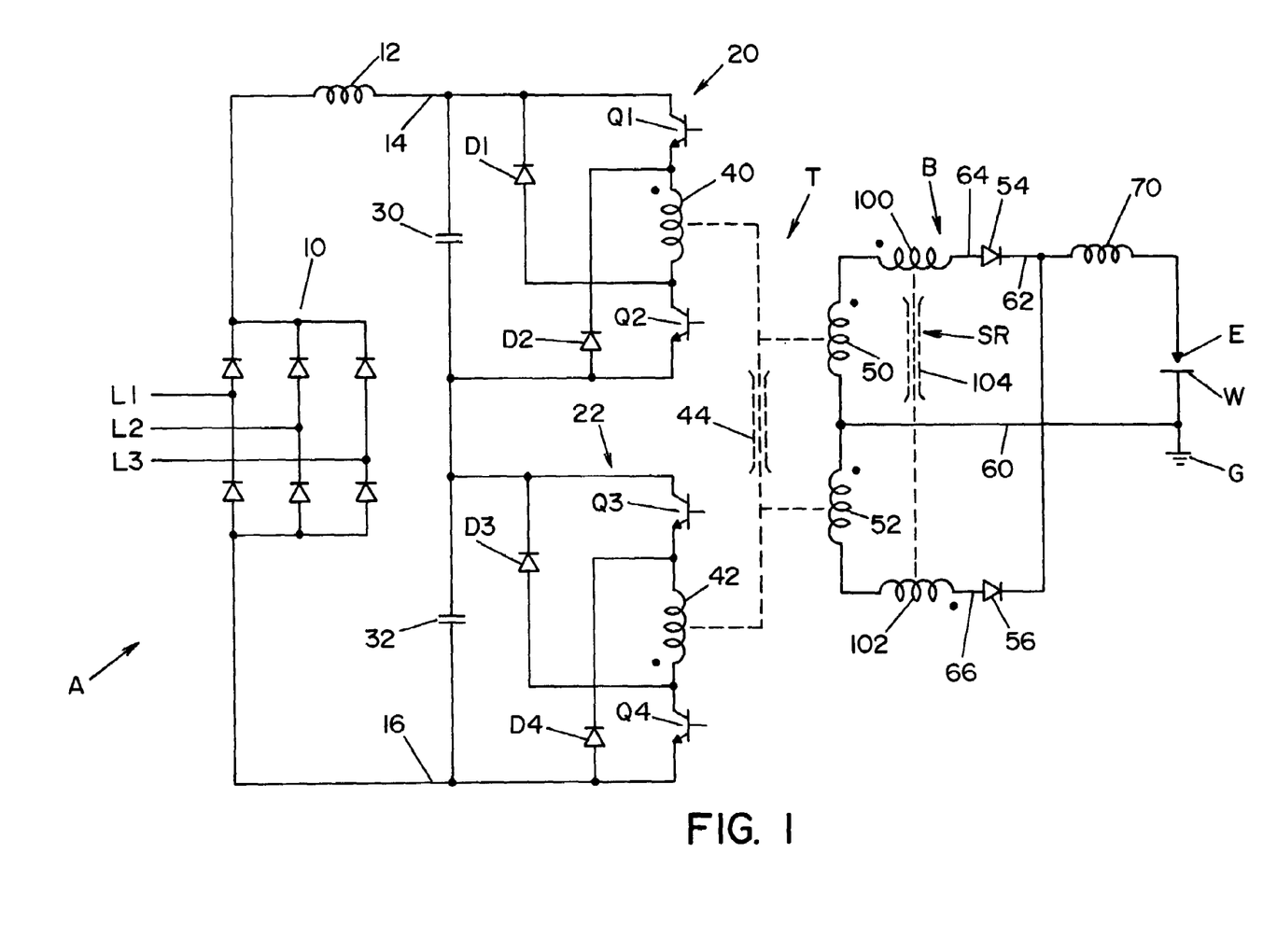
FIG. 1 is a simplified wiring diagram illustrating the preferred embodiment of the present invention.

A wiring diagram in FIG. 1 illustrates the preferred embodiment of the present invention where power source A is an inverter power source for creating a welding process schematically illustrated as an output circuit with an electrode E and a workpiece W grounded at terminal G. The power source includes an input rectifier 10 having a three phase input with a filter inductor 12 to define a DC bus at leads 14, 16. Between the two bus, there is provided two primary circuits 20, 22 connected in series and operated alternately to create output pulses for the primary side of the output transformer. Series connected capacitors 30, 32 are at the input side of primary circuits 20, 22. The first circuit 20 includes coordinated switches Q1, Q2 and clamping diodes D1, D2 to create pulses by applying the voltage of capacitor 30 across primary winding 40. Circuit 22 includes coordinated switches Q3, Q4 with clamping diodes D3 and D4 to apply the voltage of capacitor 32 across primary winding 42. Winding sections 40, 42 are the primary windings of the transformer indicated by core 44 together with dashed lines indicating transformer coupling. Primary windings 40, 42 create pulses through core 44 in secondary windings 50, 52 having output leads 64, 66 directed to an output rectifier formed by diodes 54, 56. A center tap lead 60, together with the diodes, provides a welding current across electrode E and workpiece W through a normal choke 70. Switches Q, Q2 turn on together to energize primary 40 with the voltage across capacitor 30. To create a pulse, switches Q3 and Q4 are off as switches Q1 and Q2 are on. The voltage across winding 40 is inductively coupled through core 44 to the other primary section 42. If the voltage across capacitor 32 is less than the voltage across capacitor 30, a current flows through the clamping diodes D3, D4 to equalize the voltage across the capacitors. During the subsequent switching cycle, switches Q1 and Q2 are off and switches Q2, Q4 are on. This energizes primary winding 42 with the voltage across capacitor 32. This voltage is likewise inductively coupled to the primary coil 40. If the voltage across capacitor 30 is less than the voltage across capacitor 32, charging current flows in clamping diode D1 and D2 to again equalize the voltage. This process is alternated to produce primary pulses by circuits 20, 22 forming the primary section of the output transformer for the power source. When the voltage is low due to a low duty cycle of the switches, there is not enough time for the capacitors to equalize during the high speed switching operation. The switching rate is as high as 20 kHz and preferably 40 kHz. This capacitor imbalance can cause damage to the components. To prevent this imbalance, the power source generally includes a software to skip fire one of the circuits 20, 22 allowing the capacitors to balance. The present invention overcomes the need for skip firing.

The transformer T of the welder circuit shown in FIG. 1 allows the pulses in windings 40,42 to create current pulses in secondary circuit B, including secondary windings 50,52 connected to the rectifier diodes 54,56 by way of leads 64,66. The inputs to the rectifier combine with current at center tap lead 60 to drive the welding operation through choke 70. In practice, the switching network illustrated in Stava U.S. Pat. No. 6,489,592 is used in the output circuit to drive the output welding operation. In this type of output circuit, two switches are provided on the output side of the rectifier. The output is positive voltage in lead 62. The center tap 60 is the negative voltage. These leads form the output of the secondary rectifier. By operating the Stava output switches alternately, an AC welding mode is accomplished. Either one of the Stava switches can be operated as a down chopper or continuously to provide either a positive DC welding mode or a negative DC welding mode. For the switching network, the Stava patent is incorporated herein by reference; however, it does not form a part of the invention since it is on the output side of secondary B between leads 60, 62 and the welding operation.

The invention relates to the addition of a saturable reactor couple SR in series with the secondary circuit B as a magnetic saturable reactor ring around leads 64, 66 and represented as windings 100, 102 magnetically coupled by the core 104. The saturable reactor is uniquely designed as a ring around the leads 64, 66 directed to the rectifier comprising diodes 54, 56. The saturable reactor delays pulses created in primary windings 40, 42 to allow capacitors 30, 32 to equalize or balance between switching operations. This delay prevents the problem of capacitor imbalance during low voltage obtained by short pulses in windings 40, 42. In practice, the delay of the pulses is at least about 0.5 microseconds. The saturable reactor blocks voltage during the time immediately after the switching pairs are activated. This prevents power from being coupled to the secondary windings 50, 52. The switch pair is therefore turned on for a greater time allowing the diode clamping networks in circuits 20, 22 adequate time to balance the charge on capacitors 30, 32. Setting of the time delay of the saturable reactor to about 1.0 microseconds allows adequate time for the clamping networks to operate properly and balance the capacitor voltages. However, it is found that a delay of 0.5 microsecond has beneficial results. The delay should have an upper limit which in practice is about 2.0 microseconds. Construction of the material and size of the saturable reactor SR accomplishes this desired delay by using standard well known saturable reactor technology. This saturable reactor is passive and does not include a control winding. The reactor delays the pulses in the primary by preventing current flow until the reactor is saturated. This is decreased as a delay in the voltage. It is really a delay in the action by the voltage pulse.

In accordance with an aspect of the invention, the saturable reactor is in series either with the primary or secondary windings of the transformer to accomplish the delay in the pulses for the purposes of balancing the capacitors that are used to pulse the primary windings at the output of the inverter. Another alternative use of the saturable reactor is in a matrix transformer M for an electric arc welder shown in FIG. 2 and including a power source 120 having a primary winding 122 which is pulsed by switches Q1, Q2 and switches Q3 and Q4 in accordance with standard technology. In the matrix arrangement, the matrix transformers 130, 132 and 134 include individual coupling cores 124, 126 and 128, respectively. These cores couple pulsed winding 122 to several secondaries, three of which are illustrated. Since each of the secondaries and its rectifier are the same, only secondary 130 and rectifier 140 will be explained. This explanation applies to the other secondaries and rectifiers 142 and 144 constituting matrix transformer M. Rectifier 140 includes input leads 150, 152 and an output lead 154 which is the positive terminal. The pulsed input to secondary windings 160, 162 provide a positive terminal which is the summation of the three leads 154 from the three secondaries. The negative terminal is center tap 164. As explained before, opposite polarity output leads 154, 164 are, preferably, connected to an output switch network as show in Stava U.S. Pat. No. 6,489,592. Thus, the welding installation represented by electrode E and workpiece W with choke 170 is operated in an AC welding mode, a DC positive welding mode or a DC negative welding mode. This switching network, which is used in the preferred embodiment of the invention, need only be incorporated by reference from the Stava patent and not illustrated in the preferred embodiment. The individual secondary circuits include their own saturable reactors SR1, SR2 and SR3, respectively. Some times only one secondary has the reactor. Each of the three illustrated saturable reactors are soft ferrite rings, illustrated as including a tubular configuration surrounding input leads 150,152 of rectifier 140. Each of these saturable reactors delay the voltage pulses in the input winding to allow balance of the capacitors 30, 32 shown in FIG. 1.

Figure 3:
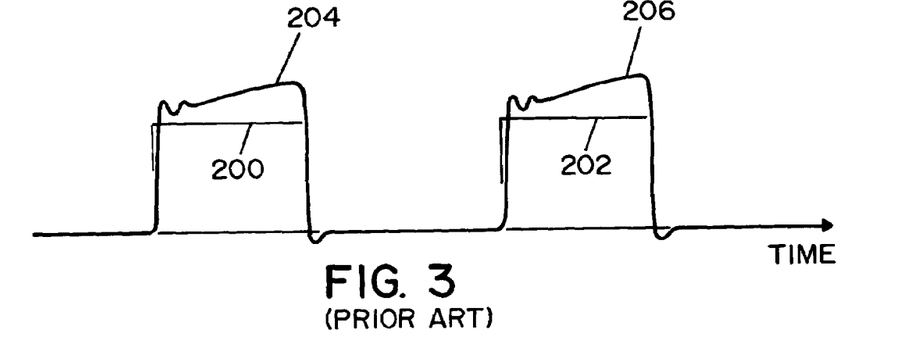
FIG. 3 is a pulse graph of voltage and current curves obtained by use of the power source without the improvement of the present invention.
Figure 4:
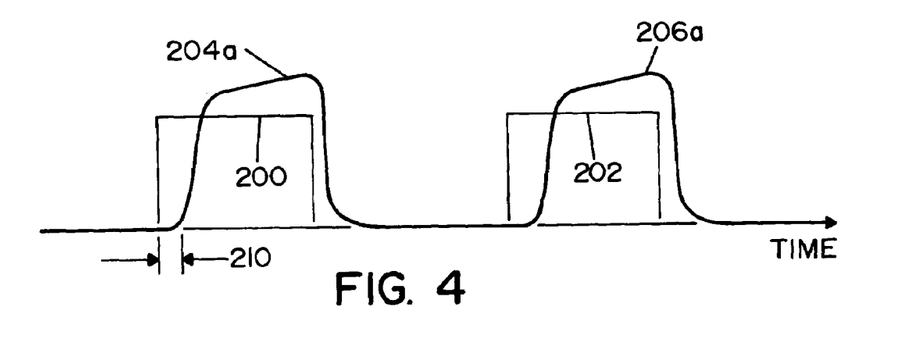
FIG. 4 is a pulse graph similar to FIG. 3 showing the advantage of using the present invention.
Figure 5:
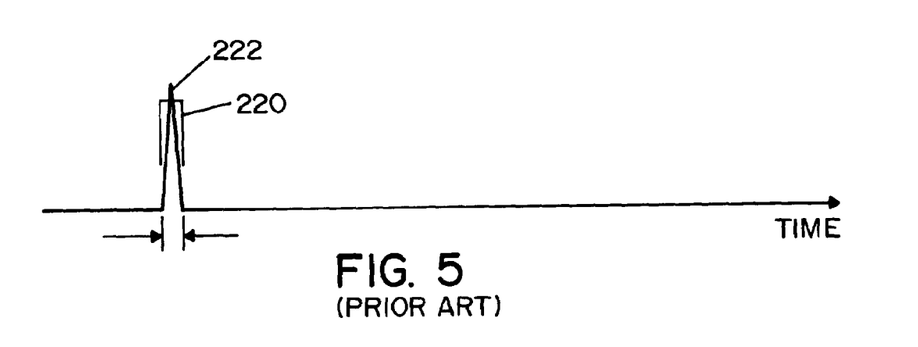
FIG. 5 is a current and voltage graph showing a single primary pulse of current and voltage obtained without the improvement of the present invention.
Figure 6:
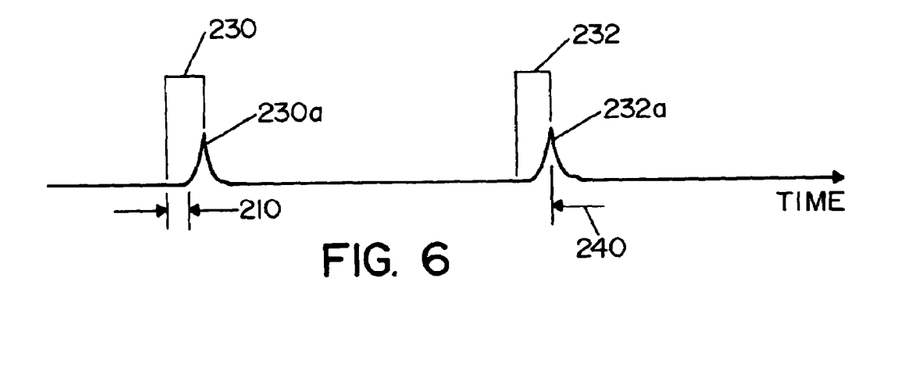
FIG. 6 is a graph similar to FIG. 5 illustrating operation of the power source utilizing the improvement of the present invention.

The operation of the saturable reactor used in the invention is schematically illustrated and compared with the prior art in FIGS. 3 and 4. The voltage pulse created by operation of the switches is illustrated as pulse 200 for switches Q1, Q2 and pulse 202 for switches Q3, Q4. In the prior art without a saturable reactor, the current in the secondary has a form indicated by graphs 204, 206. By using the saturable reactor in the secondary, the current flow is delayed to delay the actual voltage applied across the capacitors in the circuits 20, 22. This in essence delays the voltage pulse. The current flow is indicated as 204a, 206a and the delay is 210, which delay is determined by the size and material of the saturable reactor. These materials are selected so the delay is at least 0.5 microsecond and preferably 1.0 microseconds. There is an upper limit for the delay which probably is in the general range of 3.0 microseconds. The concept of the delay is to allow the capacitors 30, 32 to stabilize before reverse voltage is induced across a capacitor from operation of the opposite primary winding. The magnetic saturable reactor provides the delay 210 in the switching cycle so that no power is transferred from the primary to the secondary until the saturable reactor is saturated. The benefit is that the pulse width of the control circuit, such as the width of pulses 200, 202, can be reduced below the delay value 210 to produce a zero output power without interrupting switching cycles. This provides a mechanism to achieve smooth regulation from zero output to fill output without skip firing the electronic switches Q1–Q4. Such skip firing, as mentioned before, is a problem when regulating low currents for processes, such as TIG welding or pulse MIG welding. The delay is proportional to the volt-second product of the saturable reactors. The difference between the prior art and the use of a saturable reactor is also shown in FIGS. 5 and 6. As illustrated in FIG. 5 a very narrow pulse 220 is formed to obtain low power and low voltage output. This short pulse produces an immediate output current 222 that allows the pulse 220 to be induced into the opposite series circuit 20 or 22. There is not enough time for the clamping diodes to balance the voltage of capacitors 30, 32. Using the saturable reactor in the secondary of the transformer, as shown in FIG. 6, small voltage pulses 230 and 232 from the alternating circuits 20, 22, respectively, produce a delay 210 before any power is transmitted through the secondary circuit. The power is indicated by current pulses 230a, 232a. At low voltage, delay 210 allows balance of the capacitors. The period between the trailing edges of pulses 230, 232 is indicated as 240. As can be seen in FIG. 6, the duty cycle of the individual pulses is quite small creating the low output power and voltage. Thus, a delay in the voltage across the input capacitors is capable of balancing the capacitors without any auxiliary circuits or without skip firing.

Figure 2:
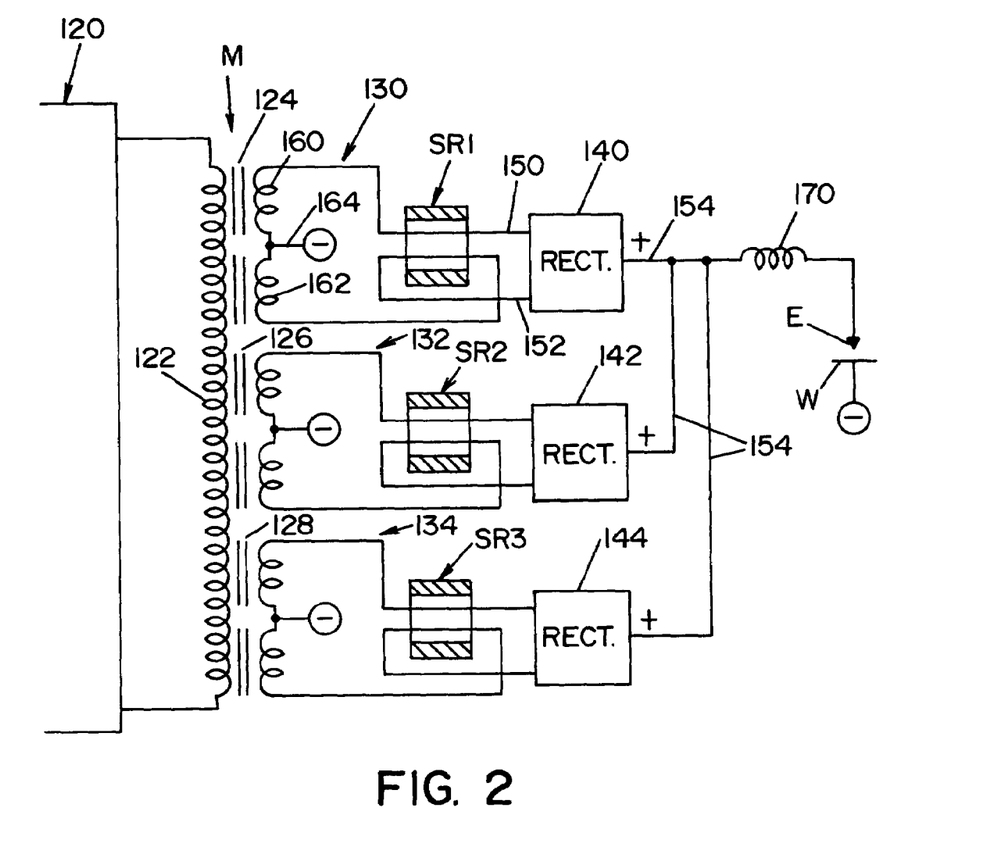
FIG. 2 is a schematic wiring diagram illustrating the use of the present invention in a matrix transformer.
Figure 7:
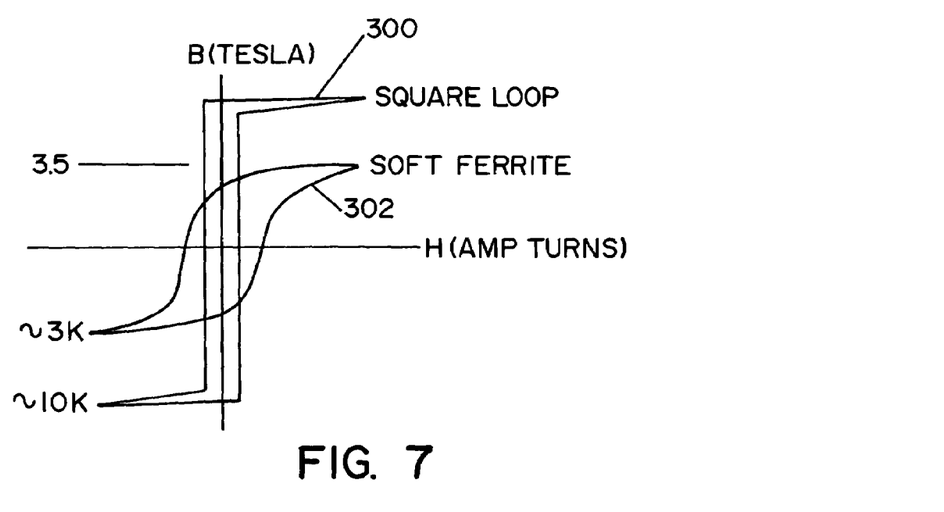
FIG. 7 is a B-H graph of the magnetic material normally used in switching reactors and the magnetic material used in the present invention.

The volt second product of saturable reactor SR is proportional to the cross-sectional area and the type of magnetic material used. The primary voltage of a power source using an inverter for electric arc welding is typically much higher than the voltage required for the actual welding operation. Consequently, the transformers in welding machines have a turns ratio that is typically in the range of 8:1 to 3:1. Locating the saturable reactors SR in the secondary circuit is preferred since the lower voltage side of the transformer is in the secondary circuits 130, 132 and 134. Consequently, the most efficient use of the magnetic core material of the saturable reactor is in the secondary network. Of course, the saturable reactor is used in the high voltage side of the transformer by being applied around the leads to primary winding 122. In practice, a saturable reactor may be passive or controlled. In the present invention, the reactor is composed of a magnetic ring core that is placed over the primary or secondary leads of the transformer. In accordance with the invention, the saturable reactor does not include a control winding that influences the time when saturation and desaturation occurs. Saturation is at a flux density less than about 0.4 Telsa and is fixed by the material and dimensions of the saturable reactor around leads 150, 152 as shown in FIG. 2. In normal practice, a saturable reactor in a switching context is chosen with a "square loop material." This is defined as "hard ferrite" and shown by the B-H curve 300 in FIG. 7. This square loop material has a high saturation flux density indicated to be about 1.0 Telsa or 10 kilo Gauss. Such hard ferrite material is employed in switching saturable reactors because the hysterises losses are low due to narrow B-H curve 300. The core losses are selected to be low so that the saturable reactor can tolerate hard saturation at high switching frequencies experienced in balanced switch supplies. Such high permeability magnetic material is desirable when control windings are used for the reactor, because a small control current can hold the core in its saturated state. Such hard ferrite materials also have a crisp switching characteristic due to the square shape of the B-H curve. Various commercial materials are available to include a hard ferrite square loop material with a curve 300. However, the present invention uses a soft ferrite material having a soft B-H curve 302, as shown in FIG. 7. The soft ferrite materials are designed to have relatively low permeability requiring high magnetizing current to achieve saturation. The saturation flux density in accordance with the present invention is relatively low, typically about 0.3 Telsa.

When applied in a saturable reactor operated at high frequency, soft ferrite cores used in the invention must be designed to achieve adequate cooling because they exhibit substantial losses during the switching operation. The present invention relates to a power source for an electric arc welder. Such power source can not use a saturable reactor with a curve 300 because such material saturates at very low current. Welding machines operate with hundreds of amperes of output current. Small imbalances in the current of a few amperes that are negligible in the operation of the welding machine can cause the square loop saturable reactor to saturate at the wrong time. To overcome this process deficiency of hard ferrite saturable reactor used in a welding operation, the saturable reactor must use a control winding to adjust the time window where saturation and desaturation occurs. This is time consuming, expensive and less attractive as a saturable reactor to delay the voltages of the input series circuits 20, 22. Thus, the present invention uses a soft material of the type having a soft curve 302. This material provides a very smooth switching characteristic and does not suffer the problems of saturating at the wrong time. Low permeability causes the material having B-H curve 302 to produce delay 210 consistently, even at high welding currents.

Figure 8:
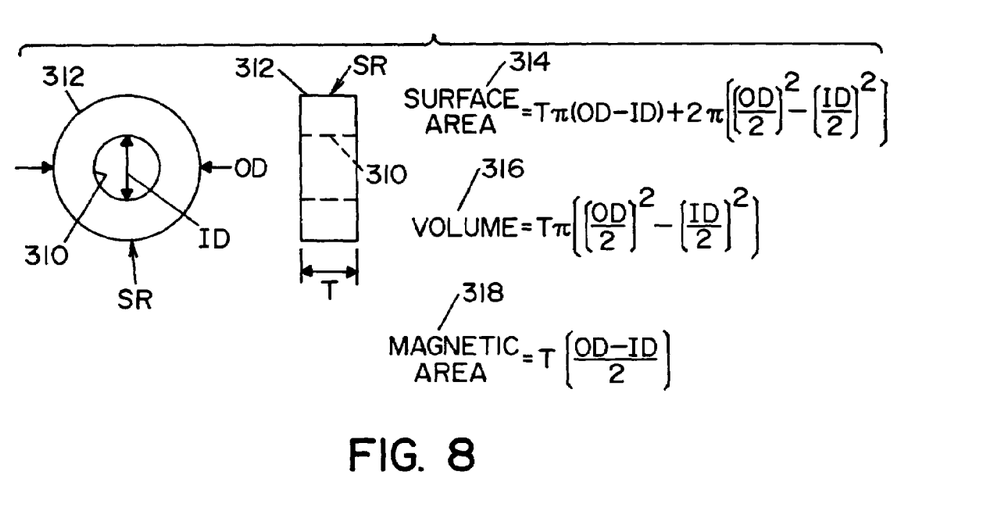
FIG. 8 is a schematic dimensionalized view illustrating the relationship between dimensions in a saturable reactor constructed in accordance with the present invention.
Figure 9:
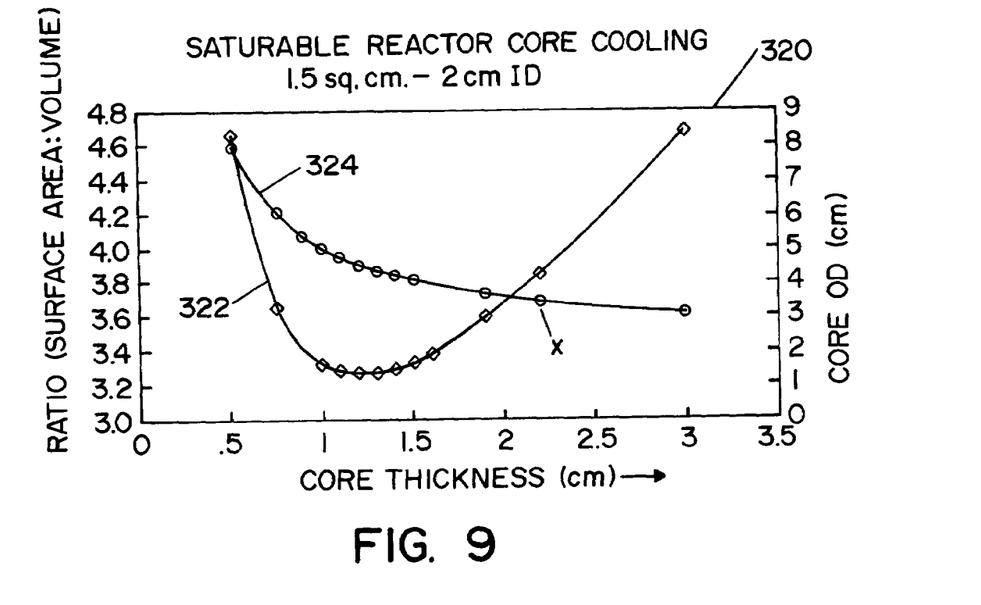
FIG. 9 is a graph having two curves illustrating certain aspects of the present invention.
Figure 11:
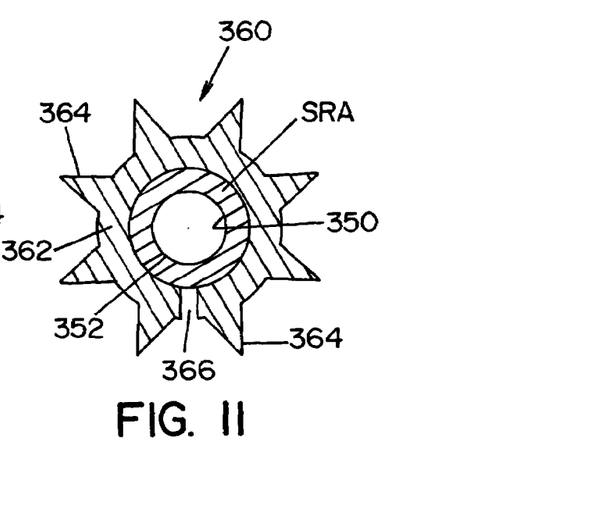
FIG. 11 is a cross-sectional view taken generally along line 11—11 of FIG. 10.
Figure 12:
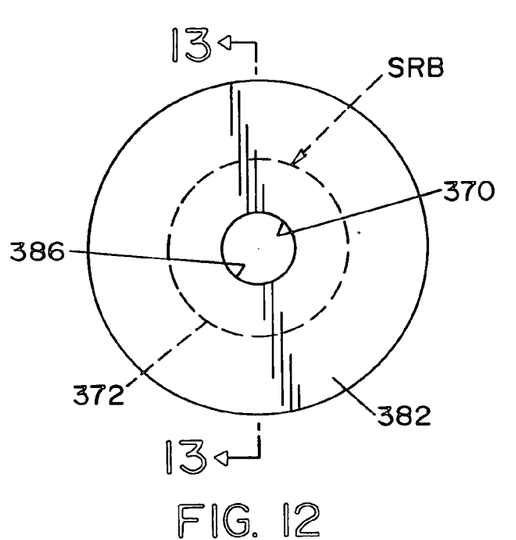
FIG. 12 is a pancake shaped saturable reactor with aluminum disks to dissipate heat.
Figure 13:
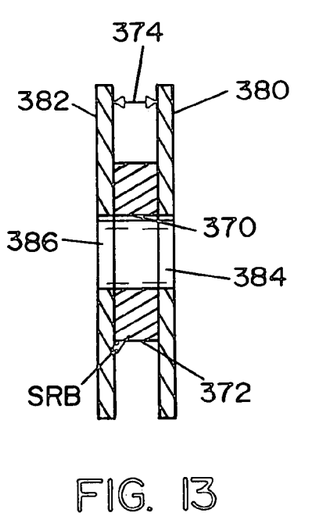
FIG. 13 is a cross-sectional view taken generally along line 13—13 of FIG. 12; and, FIG. 14 shows a saturable reactor with a rectangular cross-section with a length greater than its thickness.

Heat dissipation within the core forming the saturable reactor is a function of the core volume, shape and the type of material employed in the core. The typical soft ferrite material used in practicing the present invention has a core loss related to the maximum flux density of the curve 302. However, there is a minimal difference in the core loss values between different materials once the magnetic core area is designed for the maximum flux density to achieve a constant volt-second blocking characteristic of the present invention. The cooling of the saturable reactor is a function of both the volume of the core and the surface area of the core. The greater volume, the greater the watts that are lost and must be dissipated. Enlarging the surface area offers more opportunity to remove the heat. FIG. 8 is a schematic dimensional diagram of saturable reactor ring SR of the type used in practicing the present invention. Saturable reactor SR has an internal diameter 310 and an outside diameter 312, with a thickness T. Formulae 314, 316 and 318 are the mathematical relationship to obtain the surface area, the volume and the magnetic area of the saturable reactor. For a constant magnetic area and core shape, outside diameter 312 increases as the inside diameter 310 enlarges. As the internal diameter increases, the volume and total loss increase for a fixed core shape and the magnetic cross-section. It is desirable to use the least amount of core material to minimize the cost and total heat losses. To determine these dimensional aspects, the relationship between the cooling and magnetic characteristics were plotted in graph 320 as shown in FIG. 9 as curve 322, 324. The saturable reactor core cooling data is for a core with 1.5 square centimeter cross sectional area and with a 2.0 centimeter inside diameter 310. Curve 324 plots the changes in the outside diameter as the thickness T increases between a saturable reactor with a thickness 0.5 centimeters and an outside diameter of about 8.0 centimeters. This is a pancake shaped saturable reactor as shown in FIGS. 12 and 13. At the other extreme, with a thickness of 3.0 centimeters the outside diameter is about 3 centimeters. This produces a core with a pipe shape schematically illustrated in FIGS. 10 and 11. This is the preferred embodiment. As indicated in curve 322 the ratio of surface area to volume is high for both the pancake shape and the pipe shape extremes. Inbetween these extremes, the ratio decreases to a minimum of about 3.2 when the cross-sectional area is essentially a square shape. The higher the ratio the higher the cooling efficiency. In the preferred embodiment, the ratio is greater than 3.5. This is provided by a ring with a rectangular cross-section with a width greater than its height. This is a preferred shape.

Figure 10:
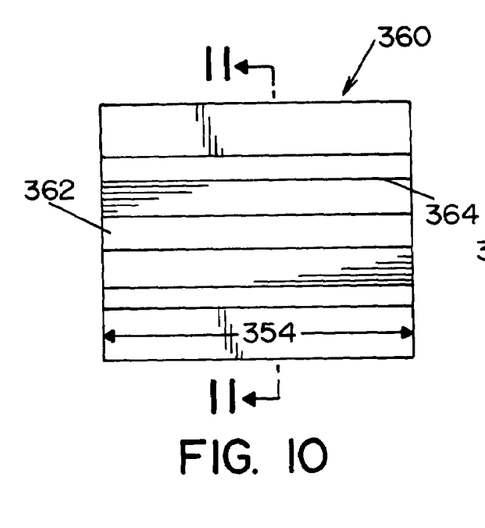
FIG. 10 is a side view of a pipe shaped saturable reactor, including an outer heat sink tube.

A saturable reactor used in obtaining the data of graph 320 has a fixed internal diameter of 2.0 centimeters. This is to accommodate the two leads extending through the center of the saturable reactor. On a per-unit length basis, the ratio of surface area to volume is constant as the internal diameter is increased provided the core shape is held constant. Consequently, there is no advantage for the internal diameter to be any larger than is necessary merely to accommodate the conductors or leads. Thus, the evaluation of the saturable reactor has a fixed internal diameter. Curve 324 establishes that for a fixed inside diameter, the outside diameter grows larger as the thickness T decreases. At the extreme limits, the shape becomes a thin disk of large diameter with a hole in the middle. This is the shape shown in FIGS. 12 and 13. Conversely, as the thickness grows larger, the outside diameter decreases. At the extreme limits the shape becomes a pipe, as shown in FIGS. 10 and 11. These two extremes maximize the ratio of surface area relative to the core volume as indicated by curve 322. The minimum ratio occurs when the cross-section of a core is a square. Curves 322, 324 illustrate concepts in selecting the shape of the saturable reactor to maximize the cooling effect for a given magnetic characteristic. Using this plotted information, the two shapes illustrated in FIGS. 10–11 and FIGS. 12–13 are preferred. Both of these shapes have a ratio of surface area to volume greater than 3.5 $cm^2/cm^3$.

Curve 322 of graph 320 indicates that there are two optimum shapes for the saturable reactor used in the present invention. The first shape is a pipe configuration represented as saturable reactor SRA in FIGS. 10–11. The second shape is a pancake configuration indicated as saturable reactor SRB in FIGS. 12–13. Saturable reactor SRA has an internal diameter 350 and an outside diameter 352 with a length or thickness 354. Of course, the internal diameter is 2.0 centimeters to accommodate leads 150, 152. Although the saturable reactor is normally used without a heat sink, in practice heat sink sleeve 360 is used with reactor SRA. This sleeve is formed from a high conductive material, such as aluminum or copper, and has a cylindrical base 362 with outwardly extending fins 364 and an expandible assembly gap 366. Sleeve 360 is snapped over saturable reactor SRA before the saturable reactor is mounted in the secondary circuit of the transformer used in a welder. Saturable reactor SRB has an internal diameter 370, an outside diameter 372 and a thickness or width 374. Saturable reactor SRB is cooled by heat sink disks 380, 382 having holes 384, 386, which holes are at least as large as the internal diameter 370. It has been found that the best shape for structural integrity is the shape shown in FIGS. 10 and 11 because the ferrite shape is stronger and the tubular extrusion for the heat sink shields the entire assembly from impact. Furthermore, this particular shape is more easily accommodated in the assembly of the transformer, especially when the transformer is a matrix as shown in FIG. 2.

Figure 14:
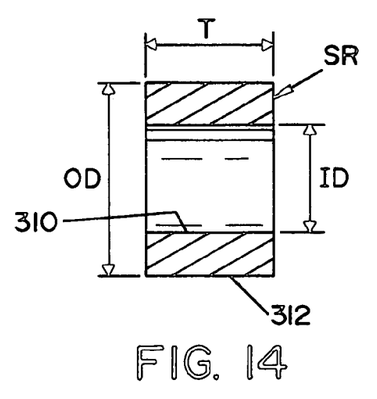

In practice, the shape of the saturable reactor has a rectangular cross-section with a length T greater than the thickness, which is the difference between the inside diameter and the outside diameter, as shown in FIG. 14. The cross-section is a rectangle with a width T greater than its height which is (OD-ID)/2. This shape is shown generally at point x in FIG. 9.

Having thus described the invention, the following is claimed:

1. In a power source for an electric arc welder including an inverter having two primary circuits connected in a series circuit across the DC bus of an input rectifier, each of said primary circuits comprising a capacitor in parallel with a primary winding section and a switch to apply the voltage of said capacitor across said primary winding section, whereby said primary circuits alternately create a voltage pulse in said primary winding sections to induce voltage pulses in a secondary circuit having a secondary winding coupled to said primary windings and connected by an output circuit to an output welding circuit, the improvement comprising: a soft ferrite saturable reactor in at least one of said series circuit or said output circuit to delay said voltage pulse in said primary winding sections and wherein said saturable reactor is passive and has a fixed saturation flux density.

2. The improvement as defined in claim 1 wherein said saturable reactor is in said output circuit.

3. The improvement as defined in claim 2 wherein the saturable reactor has a saturation flux density less than 0.50 Tesla.

4. The improvement as defined in claim 3 wherein said saturable reactor has a ratio of surface area to volume greater than 3.5 cm2/cm3.

5. The improvement as defined in claim 4 wherein said output circuit is a rectifier with two input leads and said saturable reactor is a ring surrounding both of said leads.

6. The improvement as defined in claim 5 wherein said ring has a length greater than its outside diameter.

7. The improvement as defined in claim 5 wherein the cross-section of said ring is a rectangle having a width greater than its height.

8. The improvement as defined in claim 3 wherein said saturable reactor is pipe-shaped and has a ratio of surface area to volume greater than 3.5 cm2/cm3 and wherein said saturable reactor includes an outer heat sink tube that is formed from a highly conductive material and has a cylindrical base with outwardly expanding fins and an expandable assembly gap.

9. The improvement as defined in claim 8 wherein said delay is at least 0.5 microseconds but not more than 3 microseconds.

10. The improvement as defined in claim 3 wherein said saturable reactor is pancake-shaped with heat sink disks to dissipate heat and has a ratio of surface area to volume greater than 3.5 cm2/cm3 and wherein said disks have holes at least as large as the internal diameter of said saturable reactor.

11. The improvement as defined in claim 10 wherein said delay is at least 0.5 microseconds but not more than 3 microseconds.

12. The improvement as defined in claim 3 wherein said output circuit is a rectifier with two input leads and said saturable reactor is a ring surrounding both of said leads.

13. The improvement a defined in claim 12 wherein said ring has a length greater than its outside diameter.

14. The improvement defined in claim 12 wherein the cross-section of said ring is a rectangle having a width greater than its height.

15. The improvement as defined in claim 2 wherein said output circuit is a rectifier with two input leads and said saturable reactor is a ring surrounding both of said leads.

16. The improvement as defined in claim 15 wherein said ring has a length greater than its outside diameter.

17. The improvement as defined in claim 15 wherein the cross-section of said ring is a rectangle having a width greater than its height.

18. The improvement as defined in claim 2 wherein said delay is at least 0.5 microseconds.

19. The improvement as defined in claim 1 wherein the saturable reactor has a saturation flux density less than 0.50 Tesla.

20. The improvement as defined in claim 19 wherein said saturable reactor has a ratio of surface area to volume greater than 3.5 cm2/cm3.

21. The improvement as defined in claim 20 wherein said output circuit is a rectifier with two input leads and said saturable reactor is a ring surrounding both of said leads.

22. The improvement as defined in claim 21 wherein said ring has a length greater than its outside diameter.

23. The improvement as defined in claim 21 wherein the cross-section of said ring is a rectangle having a width greater than its height.

24. The improvement as defined in claim 19 wherein said output circuit is a rectifier with two input leads and said saturable reactor is a ring surrounding both of said leads.

25. The improvement defined in claim 24 wherein said ring has a length greater than its outside diameter.

26. The improvement as defined in claim 24 wherein the cross-section of said ring is a rectangle having a width greater than its height.

27. The improvement as defined in claim 19 wherein said delay is at least 0.5 microseconds.

28. The improvement as defined in claim 1 wherein said output circuit is a rectifier with two input leads and said saturable reactor is a ring surrounding both of said leads.

29. The improvement as defined in claim 28 wherein said ring has a length greater than its outside diameter.

30. The improvement as defined in claim 28 wherein the cross-section of said ring is a rectangle having a width greater than its height.

31. The improvement as defined in claim 28 wherein said delay is at least 0.5 microseconds.

32. The improvement as defined in claim 1 wherein said delay is at least 0.5 microseconds.

33. In a pulsed transformer of an inverter driven welder, which transformer has a pulsed primary winding network and a secondary winding network, the improvement comprising: a soft ferrite, passive saturable reactor in series with said transformer, said saturable reactor includes a heat sink tube around said a ring and has a fixed saturation flux density and wherein said saturable reactor delays pulses in said primary winding network by at least 0.5 microseconds and said heat sink tube is formed from a highly conductive material and has a cylindrical base with outwardly expanding fins and an expandable assembly gap.

34. In a pulsed transformer of an inverter driven welder, which transformer has a pulsed primary winding network and a secondary winding network, the improvement comprising: a passive saturable reactor in series with said transformer, said saturable reactor is a soft ferrite ring with a cross-section as a rectangle having a width greater than its height and has a fixed saturation flux density and wherein said saturable reactor delays pulses in said primary winding network by at least 0.5 microseconds.

35. In a pulsed transformer of an inverter driven welder, which transformer has a pulsed primary winding network and a secondary winding network, the improvement comprising: a soft ferrite saturable reactor in series with said transformer, said saturable reactor is passive and has a fixed saturation flux of less than 0.40 tesla and wherein said saturable reactor delays pulses in said primary winding network by at least 0.5 microseconds.

* * * * *